United States Patent
Shiraishi et al.

(10) Patent No.: US 11,513,851 B2
(45) Date of Patent: Nov. 29, 2022

(54) JOB SCHEDULER, JOB SCHEDULE CONTROL METHOD, AND STORAGE MEDIUM

(71) Applicant: FUJITSU LIMITED, Kawasaki (JP)

(72) Inventors: Takashi Shiraishi, Atsugi (JP); Shigeto Suzuki, Kawasaki (JP); Koichi Shirahata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 416 days.

(21) Appl. No.: 16/808,527

(22) Filed: Mar. 4, 2020

(65) Prior Publication Data

US 2020/0310874 A1    Oct. 1, 2020

(30) Foreign Application Priority Data

Mar. 25, 2019    (JP) .............................. JP2019-057325

(51) Int. Cl.
*G06F 9/46*    (2006.01)
*G06F 9/48*    (2006.01)
(Continued)

(52) U.S. Cl.
CPC .......... *G06F 9/4893* (2013.01); *G06F 1/3206* (2013.01); *G06F 17/18* (2013.01);
(Continued)

(58) Field of Classification Search
CPC ...... G06F 9/4893; G06F 1/3206; G06F 17/18; G06F 9/4881; G06F 9/5027;
(Continued)

(56) References Cited

U.S. PATENT DOCUMENTS

2013/0139169 A1 * 5/2013 Prabhakar ............. G06F 9/4893
                                                            718/104
2015/0100295 A1    4/2015 Jetcheva et al.
(Continued)

FOREIGN PATENT DOCUMENTS

| JP | 2000-276460 A | 10/2000 |
|----|---------------|---------|
| JP | 2015-076091 A | 4/2015  |
| JP | 2018173837 A * | 11/2018 |

OTHER PUBLICATIONS

Aksanli et al., "A Comprehensive Approach to Reduce the Energy Cost of Network of Datacenters", 2013, IEEE, pp. 275-277. (Year: 2013).*

(Continued)

*Primary Examiner* — Kenneth Tang
(74) *Attorney, Agent, or Firm* — Fujitsu Patent Center

(57) ABSTRACT

A scheduler includes circuitry configured to, based on similarity between execution time and power consumption information of jobs executed in a system, classifies jobs into groups, construct respective time series prediction models for the groups using a power waveform included in each of the groups as teacher data, predict a power waveform at an interval including a first time from each of the constructed time series prediction models, compare a power waveform at an interval including a first time of a job in execution for which power is to be predicted with the predicted power waveform of each of the groups to identify a similar time series prediction model, based on the identified time series (Continued)

prediction model, predict power consumption at a predetermined interval including a second time for the job for which power is to be predicted, and control job execution based on the predicted power consumption.

7 Claims, 21 Drawing Sheets

(51) Int. Cl.
    *G06F 1/3206*     (2019.01)
    *G06K 9/62*     (2022.01)
    *G06K 9/00*     (2022.01)
    *G06F 17/18*     (2006.01)

(52) U.S. Cl.
    CPC ......... *G06K 9/00543* (2013.01); *G06K 9/623* (2013.01); *G06K 9/6215* (2013.01)

(58) Field of Classification Search
    CPC ... G06F 9/5038; G06F 9/505; G06K 9/00543; G06K 9/6215; G06K 9/623; G06N 20/00; G06N 3/08
    USPC .......................................................... 718/102
    See application file for complete search history.

(56) References Cited

U.S. PATENT DOCUMENTS

| | | | |
|---|---|---|---|
| 2016/0013652 A1* | 1/2016 | Li | H02J 3/46 307/24 |
| 2017/0364839 A1* | 12/2017 | Kawatsu | G06Q 30/0202 |
| 2018/0018201 A1* | 1/2018 | Ueno | H04L 67/131 |
| 2018/0046505 A1* | 2/2018 | Saga | G06N 20/00 |
| 2019/0369963 A1* | 12/2019 | Utsumi | H02J 13/00 |
| 2020/0257992 A1* | 8/2020 | Achin | G06N 20/10 |

OTHER PUBLICATIONS

Bouchez et al., "HPC for power systems in the framework of PEGASE project", 2012, IEEE, pp. 1-8. (Year: 2012).*
Ide et al., "Prediction device, prediction system, prediction method and program", English translation of JP 2018173837 A, IP.com, pp. 1-10. (Year: 2018).*
Emeras et al., "EVALIX: Classification and Prediction of Job Resource Consumption on HPC Platforms", 2015, Job Scheduling Strategies for Parallel Processing, pp. 1-20. (Year: 2015).*

* cited by examiner

JOB SCHEDULER, JOB SCHEDULE CONTROL METHOD, AND STORAGE MEDIUM

CROSS-REFERENCE TO RELATED APPLICATION

This application is based upon and claims the benefit of priority of the prior Japanese Patent Application No. 2019-57325, filed on Mar. 25, 2019, the entire contents of which are incorporated herein by reference.

FIELD

The present disclosure relates to a job scheduler and a job schedule control method.

BACKGROUND

The electric power charge of the high-performance computing (HPC) system is determined by the maximum monthly value of the average value of power consumption in a certain time section. For this reason, the electric power charge is kept lower as the power consumption is leveled in each time section. Therefore, a technique for predicting the power consumption of the HPC system for leveling has been offered.

For example, Japanese Laid-open Patent Publication No. 2015-76091 and Japanese Laid-open Patent Publication No. 2000-276460 are disclosed as the related art.

SUMMARY

According to an aspect of the embodiments, a job scheduler includes a memory, and circuitry coupled to the memory and configured to, based on similarity between execution time and power consumption information of a plurality of jobs executed in a system, classifies the plurality of jobs into a plurality of groups, construct respective time series prediction models for the plurality of groups using a power waveform included in each of the plurality of groups as teacher data, predict a power waveform at a predetermined interval including a first time from each of the constructed time series prediction models, compare a power waveform at a predetermined interval including a first time of a job in execution for which power is to be predicted with the predicted power waveform of each of the plurality of groups to identify a similar time series prediction model from among the respective time series prediction models of the plurality of groups, based on the identified time series prediction model, predict power consumption at a predetermined interval including a second time for the job for which power is to be predicted, and control job execution based on the predicted power consumption.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The related art described above has a problem that nay be difficult to accurately predict the power consumption of the system. For example, when executing a job in the system, it is conceivable to predict, based on the time series pattern of power consumption until a certain time point, the power consumption after the time point. On the other hand, when the periodicity of the time series pattern is small, similar time series patterns may not appear repeatedly, so that in the above method, the prediction accuracy may decrease.

Embodiments of a job scheduler and a job schedule control method according to the present disclosure will be described below in detail with reference to the drawings. In addition, this disclosure is not limited by the embodiments. The embodiments may be appropriately combined within a consistent range.

First Embodiment

The job scheduler according to the first embodiment is a program for predicting power consumption of a job execution system that executes a job, and performing the scheduling of jobs so that power consumption is leveled. For example, the job execution system is an HPC system. The job execution schedule and charging of the electric power charge, which are prerequisites in the first embodiment, will be described.

Figure 1:
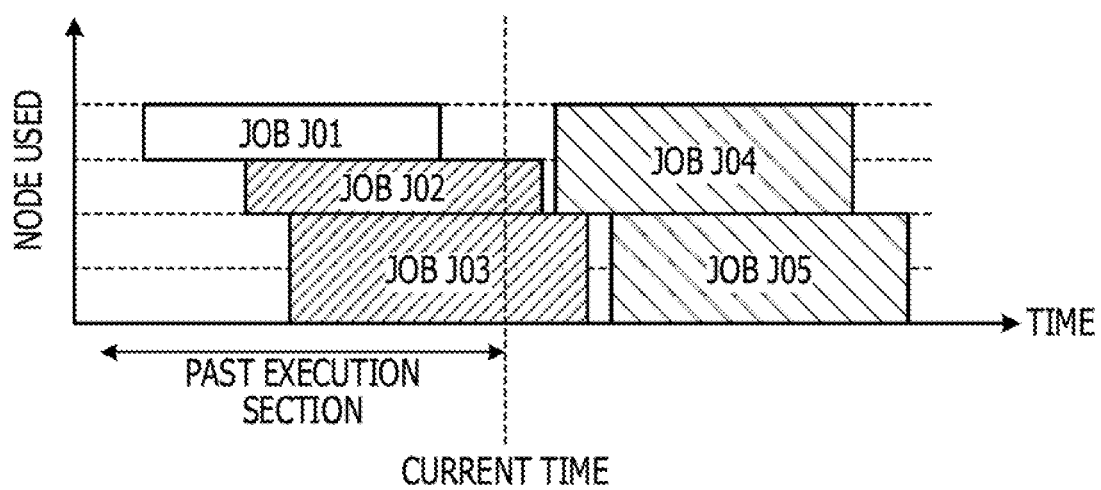
FIG. 1 is a diagram for explaining a job execution schedule.

FIG. 1 is a diagram for explaining a job execution schedule. As illustrated in FIG. 1, it is assumed that a plurality of nodes is prepared in advance in the job execution system. A job is assigned to one or more nodes. Also, the job assigned to the node waits in the queue until the execution start time. In the example of FIG. 1, a job J01 is a job that was executed in the past execution section before the current time. A job J02 and a job J03 are jobs that are currently being executed. A job J04 and a job J05 are jobs waiting for execution in the queue.

The electric power charge of the job execution system is determined by the maximum value for the predetermined period of the average value of power consumption in a certain time section. For example, the larger the maximum value for one month of the average value of power consumption every 30 minutes, the higher the electric power charge for the one month. When the average value exceeds a preset contract power, a huge additional charge may occur.

Figure 2:
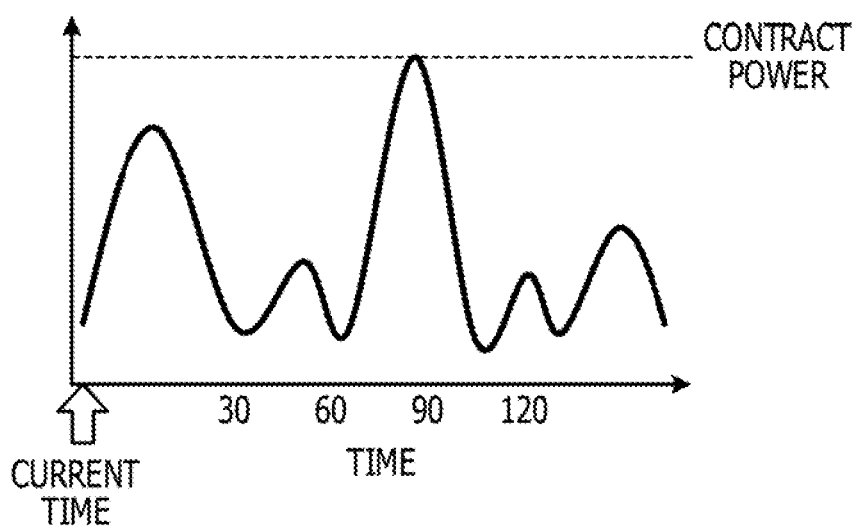
FIG. 2 is a diagram for explaining prediction of power consumption.

FIG. 2 is a diagram for explaining prediction of power consumption. As illustrated in FIG. 2, the job scheduler predicts power consumption after the current time. For example, the job scheduler may reconfigure the job execution schedule based on the prediction result so that the power consumption does not exceed the contract power.

The configuration of the learning device and the control device in the embodiment will be described. The learning device is a device for learning each model used by the control device. The control device is a device for controlling the job execution system. The job scheduler is a program that causes the learning device and the control device to execute each process. The learning device and the control device may be implemented as one device. For example, the job scheduler is executed by a device having both functions of the learning device and the control device.

Figure 3:
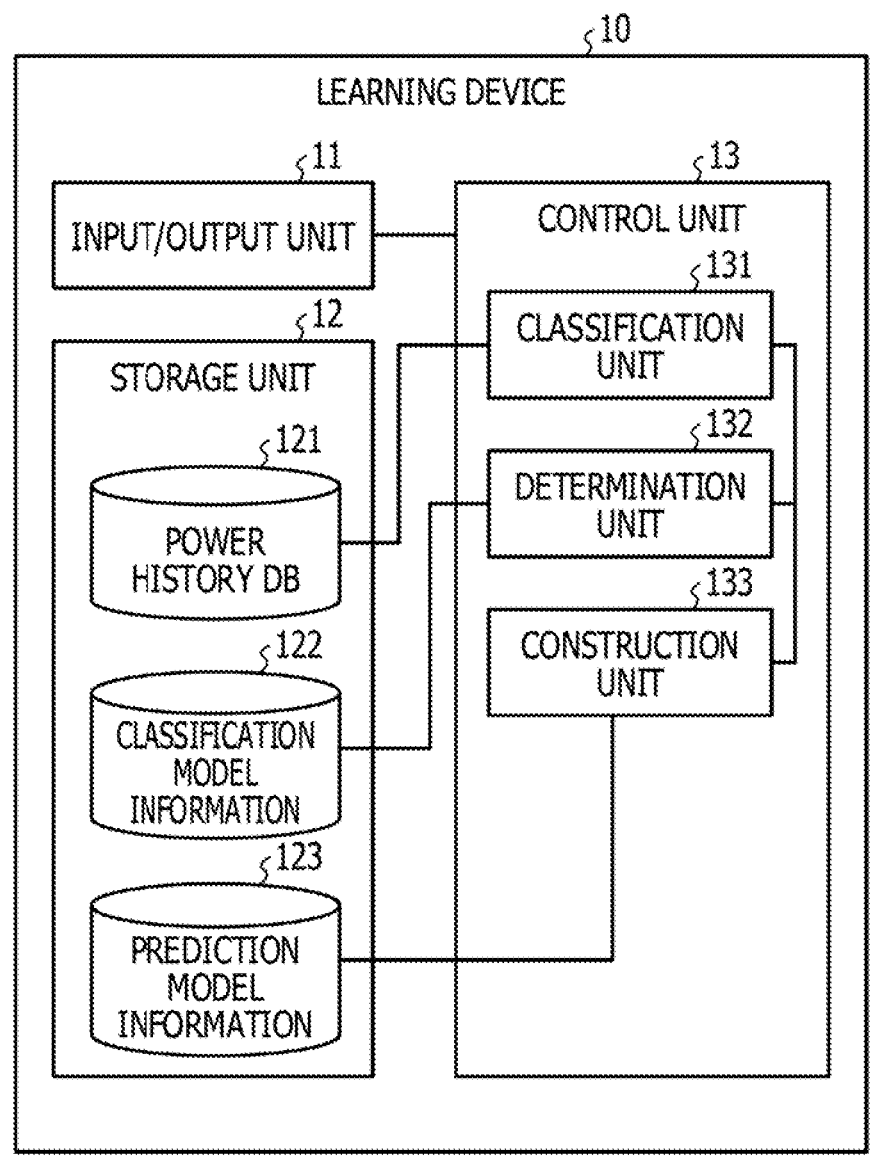
FIG. 3 is a diagram illustrating an example of a functional configuration of a learning device according to the embodiment.

FIG. 3 is a diagram illustrating an example of a functional configuration of a learning device according to the embodiment. As illustrated in FIG. 3, a learning device 10 includes an input/output unit 11, a storage unit 12, and a control unit 13. The input/output unit 11 is an interface for inputting/outputting data.

The storage unit 12 is an example of a storage device that stores data, a program executed by the control unit 13, and the like, and is, for example, a hard disk or a memory. The storage unit 12 stores a power history DB 121, classification model information 122, and prediction model information 123.

The power history DB 121 is a history of power consumption of the job execution system. For example, the power history DB 121 is information associating submission time information of the executed job with power consumption for each time. The submission time information includes a script for executing a job, information for identifying a user performing the job, information for identifying a job, information for identifying a node to be used, information for identifying an IO interface to be used, and the like. The power history DB 121 may include an average value of power consumption for every certain period.

The classification model information 122 is information for constructing a classification model for classifying submission time information of the job in a queue into a group. For example, the classification model information 122 is generated by learning sing the data of the power history DB 121 as teacher data. For example, the classification model information 122 is a weight given to each piece of information included in the submission time information.

The prediction model information 123 is information for constructing a prediction model for predicting a future power consumption waveform from a past power consumption waveform. The prediction model information 123 stores information for the prediction model corresponding to each of a plurality of preset groups.

Classification models are, for example, a supervised latent dirichlet allocation (LDA, topic classification) and a random forest. In the classification model, each piece of information may be vectorized by tf-idf. Examples of the prediction model include a recurrent neural network (RNN), a GP (Gaussian process regression), a support vector machine regression (SVR), and a decision tree.

The function of the control unit 13 is implemented by a program stored in an internal storage device and executed by, for example, a central processing unit (CPU), a microprocessor unit (MPU), or a graphics processing unit (GPU) by using a random-access memory (RAM) as a work region. The function of the control unit 13 may be implemented by an integrated circuit such as an application specific integrated circuit (ASIC) or a field-programmable gate array (FPGA). The control unit 13 includes a classification unit 131, a determination unit 132, and a construction unit 133.

Figure 4:
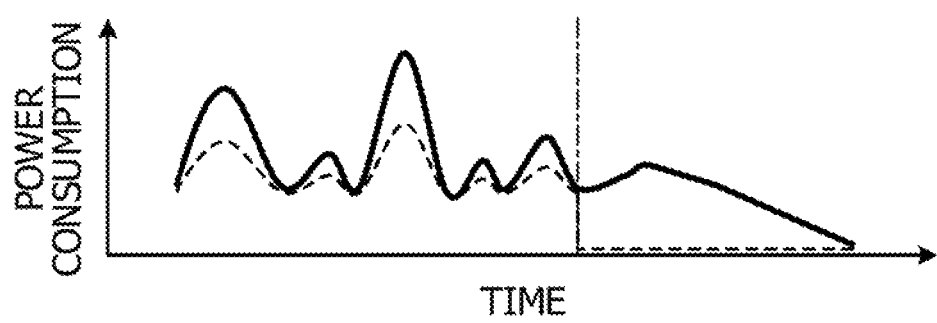
FIG. 4 is a diagram for explaining jobs having different execution times.

The classification unit 131 performs a first classification. In the first classification, the classification unit 131 classifies the jobs into a plurality of groups based on similarity of the execution time and the power consumption information of the jobs executed in the system. As illustrated in FIG. 4, even when the power consumption waveforms between jobs are similar, the execution times between the jobs may be different. The solid curve and the dashed curve in FIG. 4 indicate the power consumption waveforms of different jobs. As illustrated in FIG. 4, the execution of one job is finished at a certain time and power is not consumed after the execution.

Figure 5:
FIG. 5 is a diagram for explaining a distance calculation method.

For this reason, the classification unit 131 calculates the degree of similarity between jobs including the difference in the time direction. For example, as illustrated in FIG. 5, the classification unit 131 calculates, as the degree of similarity, the sum of the distance from a data point corresponding to each time of one waveform to a data point, of the other waveform, which is the closest to the data point of the one waveform. FIG. 5 is a diagram for explaining a distance calculation method.

The classification unit 131 classifies jobs by the following procedure, for example. It is assumed that a serial number is assigned to each job. First, the classification unit 131 calculates the degree of similarity of all other jobs with respect to the first job. Next, the classification unit 131 clusters jobs whose degree of similarity is equal to or less than the threshold value a with respect to the first job. The classification unit 131 repeats the same process for respective jobs.

At this time, the classification unit 131 merges a job when a serial number assigned to the job included in the cluster with respect to a certain job is equal to or less than β. For example, the classification unit 131 excludes, from the cluster of the fifth job, a job whose serial number is β or less, and which is any of the first to fourth jobs and is already clustered among jobs clustered with respect to the fifth job. The classification unit 131 groups the finally remaining cluster as a group.

The classification unit 131 performs the second classification. In the second classification, the classification unit 131 uses a classification model constructed from the classification model information 122 to classify jobs into a group based on the submission time information. It is assumed that the group is determined in the first classification by the classification unit 131. In the second classification, the classification unit 131 classifies the submission time information into a group according to the result obtained by assigning a weight to each piece of information determined as the submission time information of the power prediction target.

The determination unit 132 determines the weight of each piece of information of the submission time information so that the submission time information set at the time of submission of the job included in the group classified in the second classification is classified into each group. For example, the determination unit 132 learns the classification model. The determination unit 132 determines the weight in the classification model so that the classification unit 131 classifies the job into a known correct group, and optimizes the classification model information 122 according to the determined weight.

Figure 6:
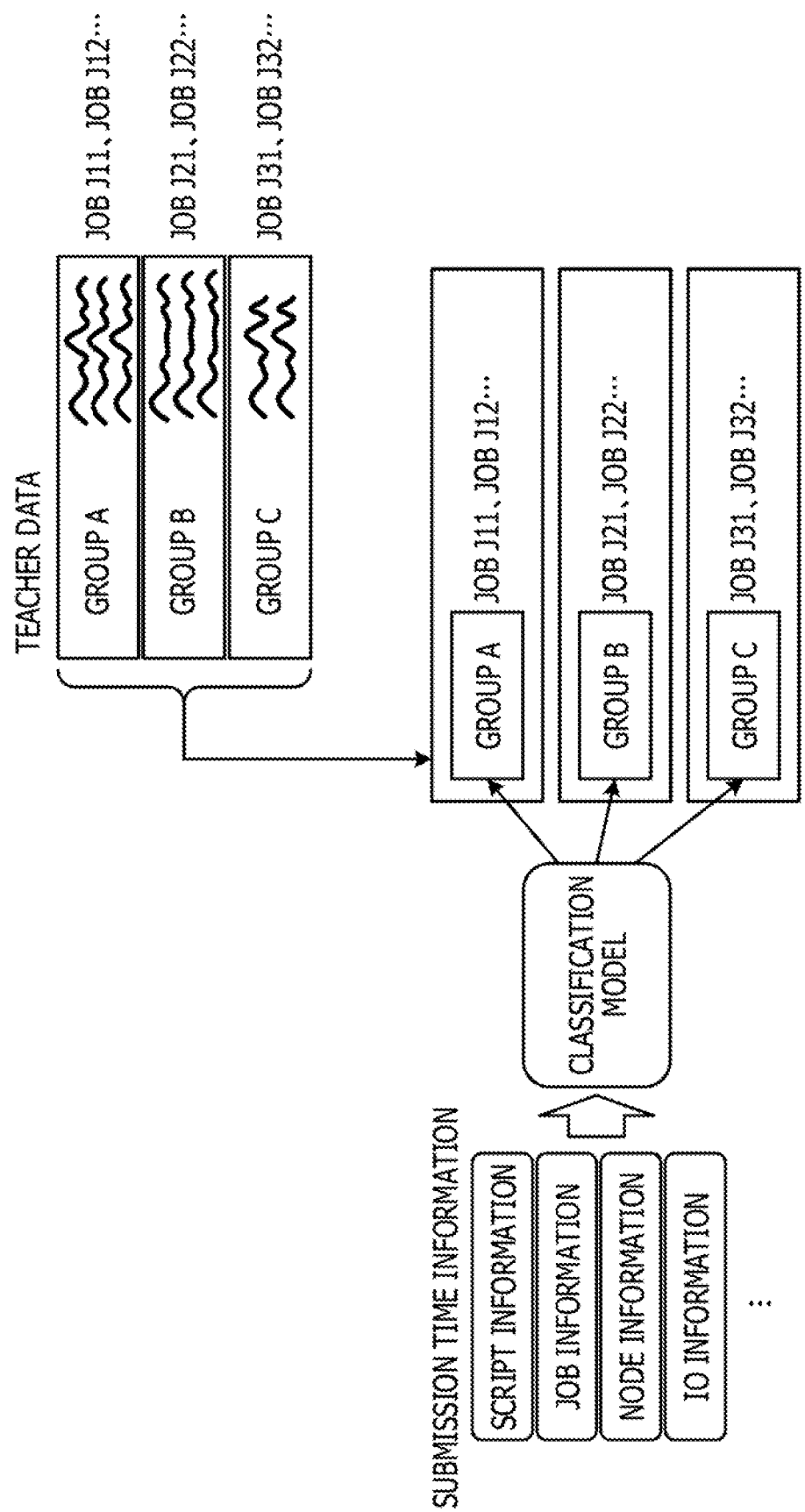
FIG. 6 is a diagram for explaining a classification model learning process.

FIG. 6 is a diagram for explaining a classification model learning process. It is assumed that jobs executed in the past are classified into group A, group B, and group C by the first classification of the classification unit 131. For example, a job J11, a job J12, and the like are classified into group A. In the learning process of the classification model, the classification result in the first classification is teacher data.

In the second classification, the classification unit 131 inputs the submission time information to the classification model, and obtains the classification result of each job. The determination unit 132 optimizes the classification model so that the classification result obtained at this time matches the teacher data.

For each group that the classification unit 131 classifies in the first classification, the construction unit 133 constructs a time series prediction model using the power waveform included in each group as teacher data. For example, the construction unit 133 learns the prediction model. The construction unit 133 stores the information of the constructed prediction model in the storage unit 12 as the prediction model information 123.

Figure 7:
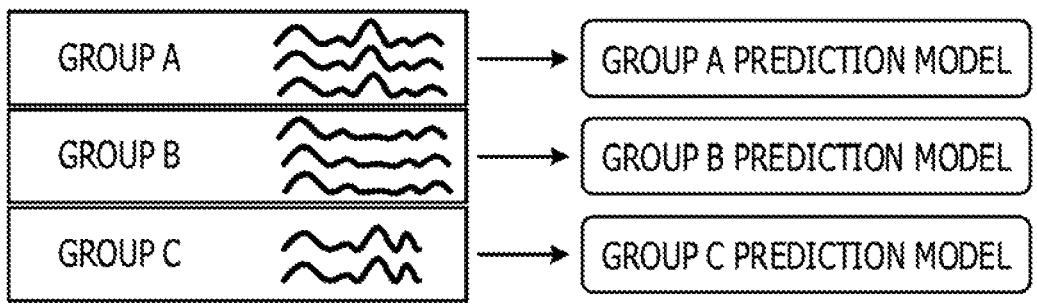
FIG. 7 is a diagram for explaining a prediction model learn process.

FIG. 7 is a diagram for explaining a prediction model learning process. In the prediction model learning process, the power consumption waveform of the job executed in the past is teacher data. For example, the construction unit 133 constructs an RNN that matches the waveform of each groups.

Figure 8:
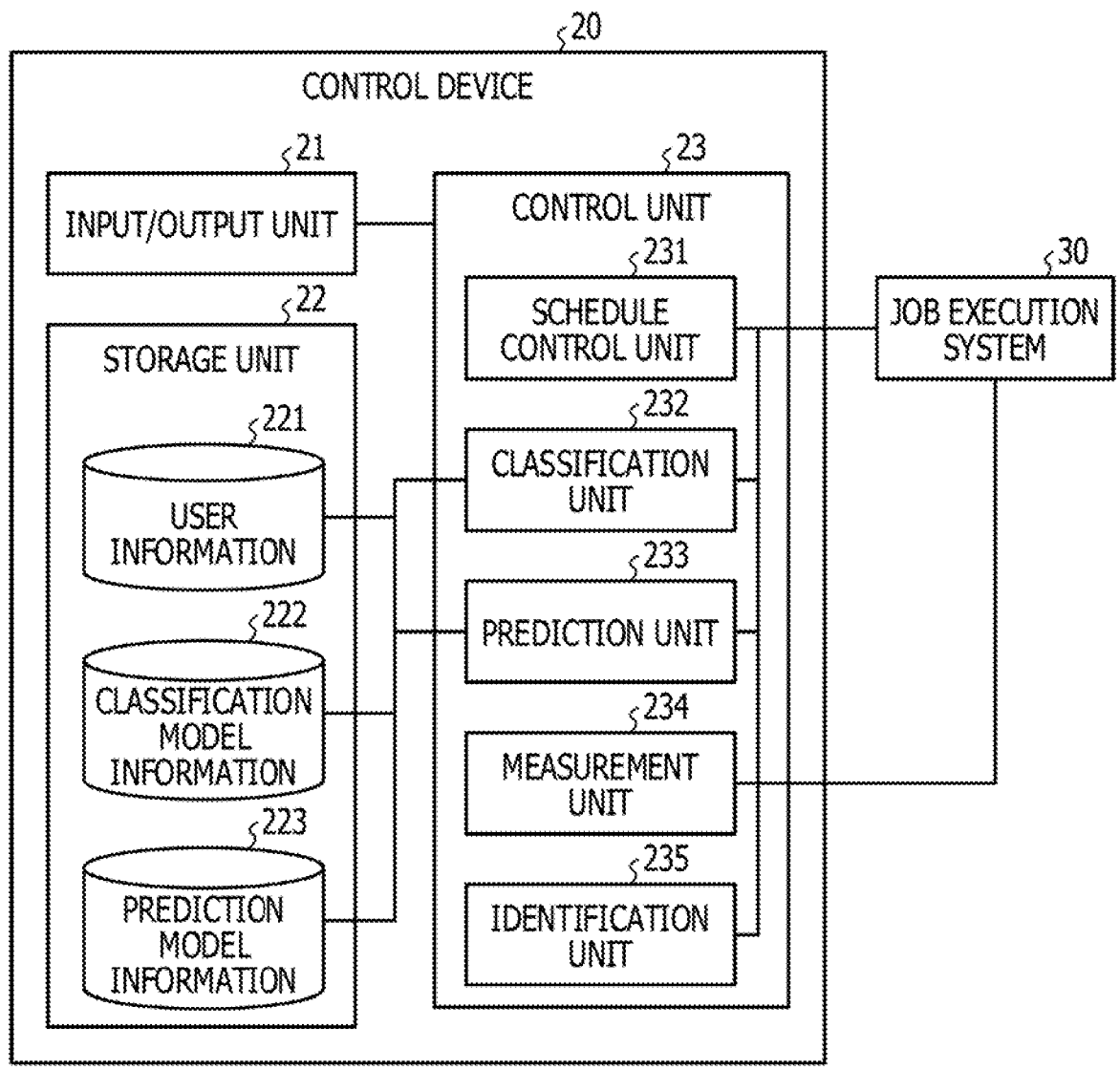
FIG. 8 is a diagram illustrating an example of a functional configuration of a control device according to the embodiment.

FIG. 8 is a diagram illustrating an example of a functional configuration of a control device according to the embodiment. As illustrated in FIG. 8, a control device 20 includes an input/output unit 21, a storage unit 22, and a control unit 23. The input/output it 21 is an interface for inputting/outputting data.

The storage unit 22 is an example of a storage device that store data, a program executed by the control unit 23, and the like, and is, for example, a hard disk or a memory. The storage unit 22 stores user information 221, classification model information 222, and prediction model information 223.

The user information 221 is information in which information for identifying a user performing the job is associated with a group.

The classification model information 222 is information for constructing a classification model for classifying submission time information into a group. For example, the classification model information 222 is the classification model information 122 that has been learned in a learning device 10.

The prediction model information 223 is information for constructing a prediction model for predicting a future power consumption waveform from the past power consumption waveforms. For example, the prediction model information 223 is the prediction model information 123 that has been learned in the learning device 10.

The function of the control unit 23 is implemented by a program stored in an internal storage device and executed by, for example, a CPU, an MPU, or a GPU by using a RAM as a work region. The function of the control unit 23 may be implemented by an integrated circuit such as the ASIC or the FPGA, for example. The control unit 23 includes a schedule control unit 231, a classification unit 232, a prediction unit 233, a measurement unit 234, and an identification unit 235.

The schedule control unit 231 adjusts the schedule of the job executed by a job execution system 30 based on the power consumption prediction result by the prediction unit 233. For example, the schedule control unit 231 ensures that power consumption does not exceed contract power by changing the job execution start time, and changing the node in which the job is executed.

The classification unit 131 classifies the submission time information into a group according to the result obtained by assigning a weight to each piece of information determined as the submission time information of the power prediction target. For example, the classification unit 131 uses the classification model constructed from the classification model information 222 to classify the job in the queue into a group based on the submission time information.

Figure 9:
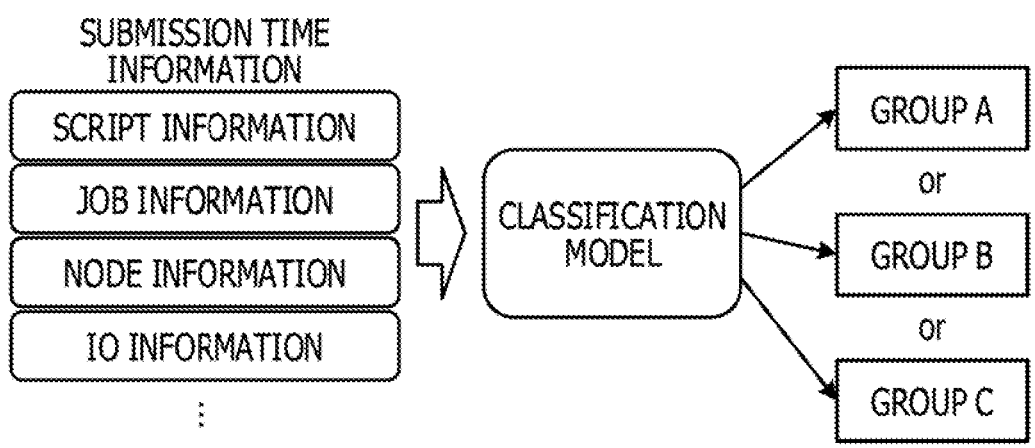
FIG. 9 is a diagram for explaining a classification process.

FIG. 9 is a diagram for explaining a classification process. As illustrated in FIG. 9, submission time information of the job in a queue whose group is unknown is input to a classification model to obtain a job classification result. For example, the classification unit 131 classifies the job in the queue into any one of group A, group B, and group C.

The prediction unit 233 predicts power consumption using a prediction model constructed from the prediction model information 223. The prediction unit 233 predicts the power consumption of the job in the queue from the time series prediction model of the group classified by the classification unit 131. With respect to the job in execution, the prediction unit 233 predicts the power consumption at the next predetermined interval for the job for which power is to be predicted based on the identified time series prediction model. The time series prediction model is identified by the identification unit 235. The predetermined interval is a time section having a predetermined length such as 30 minutes.

The prediction unit 233 outputs a result of predicting power consumption using one prediction model for one job in each time section. On the other hand, the prediction unit 233 also performs prediction using a prediction model not to be output in each time section. The result of prediction using a prediction model not to be output is used to identify a prediction model to be output in the next predetermined section.

The measurement unit 334 measures the power consumption of a job execution system 30. The measurement result by the measurement unit 234 is used for identifying the prediction model by the identification unit 235. The learning device 10 may acquire the power consumption measured by the measurement unit 234 and create the power history DB 121.

The identification unit 235 compares the power waveform at a predetermined interval including the obtained current time with respect to the job in execution for which the power is to be predicted with the power waveform predicted by the prediction unit 233 to identify the similar time series prediction model. It is assumed that the prediction unit 233 predicts, for each predetermined interval, a power waveform at a predetermined interval including the current time from a time series prediction model constructed for each classified group.

The identification unit 235 identifies the first time series prediction model most similar to the power waveform over the entire section of the first job. At this time, the identification unit 235 creates the user information 221 by associating the group corresponding to the identified first time series prediction model with the user performing the first job. When the second job is performed by the same user as the user performing the first job, the identification unit 235 identifies the first time series prediction model as the time series prediction model at the first predetermined section of the second job. At this time, the prediction unit 233 predicts the power consumption at the first predetermined section using the first time series prediction model.

Figure 10:
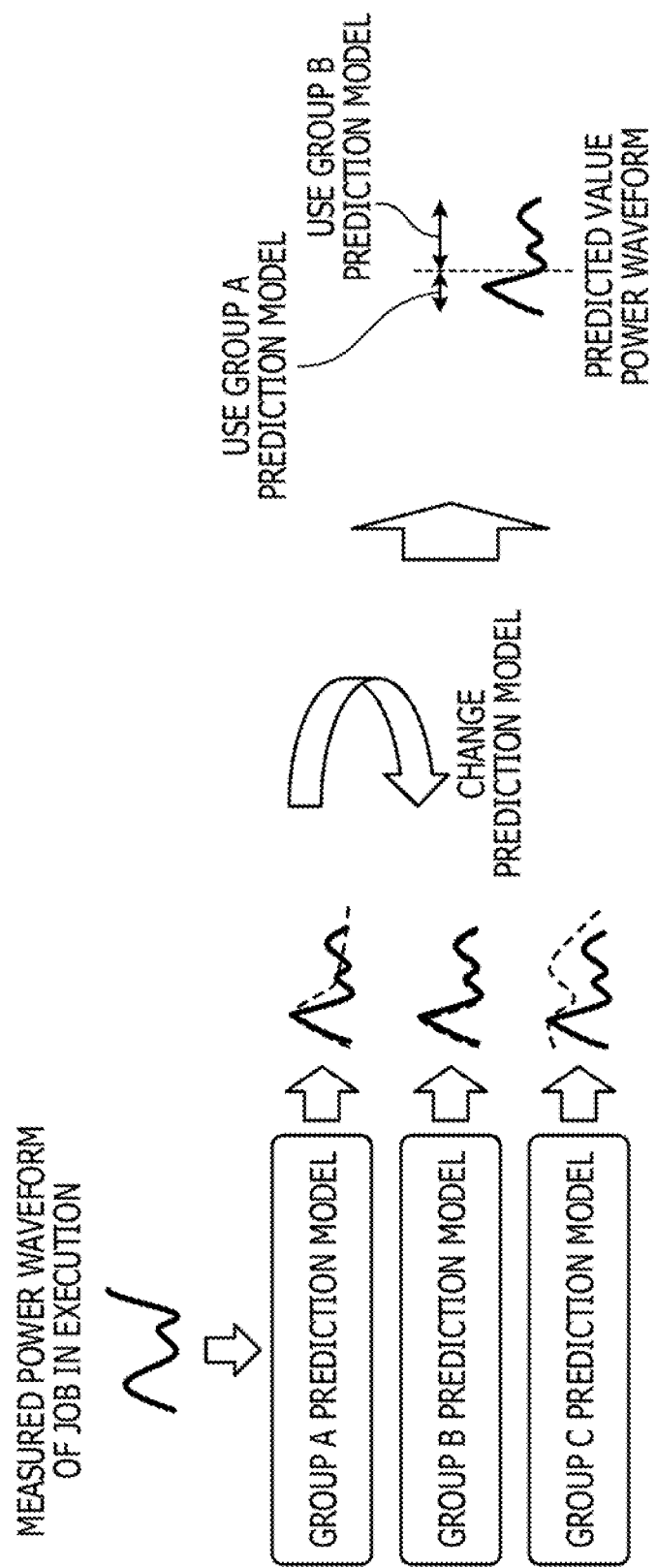
FIG. 10 is a diagram for explaining a prediction process.

FIG. 10 is a diagram for explaining a prediction process. As illustrated in FIG. 10 the prediction unit 233 predicts the power consumption at a certain time section using the prediction model of group A, the prediction model of group B, and the prediction model of group C. Of the waveforms predicted by the prediction unit 233, the identification unit 235 identifies the prediction model corresponding to the waveform having the highest degree of similarity to the actual waveform of the job in execution as the prediction model at the next time section. As a result, the prediction model which outputs a prediction result for every time section is changed into the optimal one.

Figure 11:
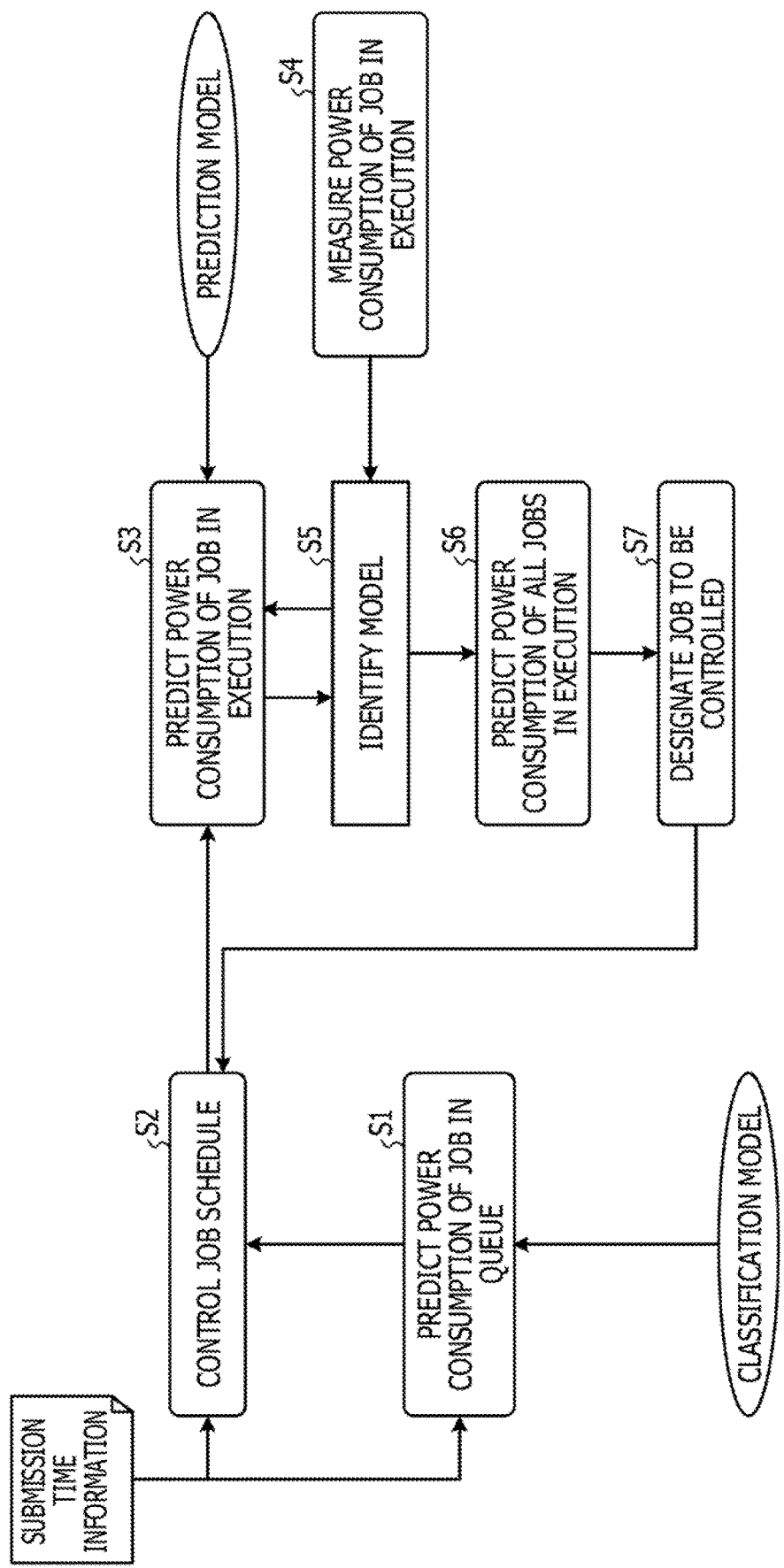
FIG. 11 is a diagram for explaining a control process.

The flow of the control process by the control device 20 will be described with reference to FIG. 11. FIG. 11 is a diagram for explaining a control process. First, as illustrated in FIG. 11, the prediction unit 233 predicts the power consumption of the job in the queue using the prediction model corresponding to the group classified by the classification unit 232 (step S1). The schedule control unit 231 controls the job execution schedule based on the power consumption prediction result (step S2).

The prediction unit 233 predicts the power consumption of the job in execution (step S3). At this time, the measurement unit 234 measures the actual power consumption of the job in execution (step S4). The identification unit 235 compares the power consumption predicted by the prediction unit 233 with the power consumption measured by the measurement unit 234, and identifies the prediction model to be used next (step S5).

The prediction unit 233 predicts the power consumption of all jobs being executed (step S6), and designates the job to be controlled for the schedule control unit 231 based on the prediction result (step S7). For example, the prediction unit 233 designates a job that is scheduled to be executed at a time when the overall power consumption is expected to exceed the contract power.

[Process Flow]

Figure 12:
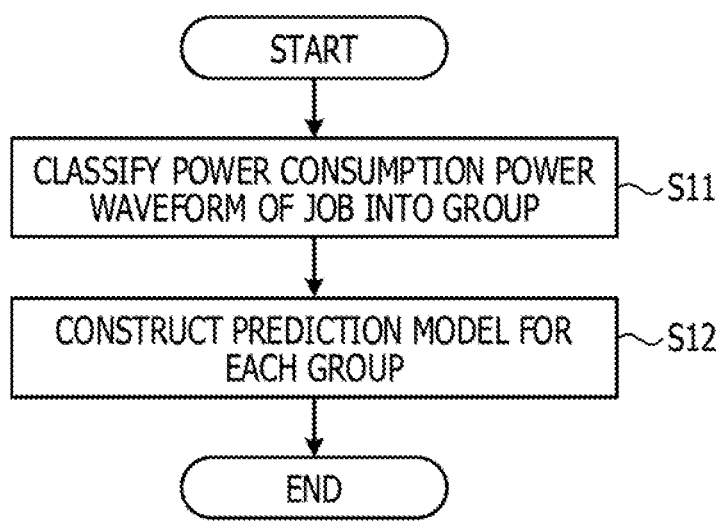
FIG. 12 is a flowchart illustrating the flow of a prediction model learning process.

The flow of the prediction model learning process performed by the learning device 10 will be described with reference to FIG. 12. FIG. 12 is a flowchart illustrating the flow of a prediction model learning process. As illustrated in FIG. 12, first, the learning device 10 classifies the waveform of the power consumption of the job into a group (step S11). The learning device 10 constructs a prediction model for each group based on the power consumption waveform (step S12).

Figure 13:
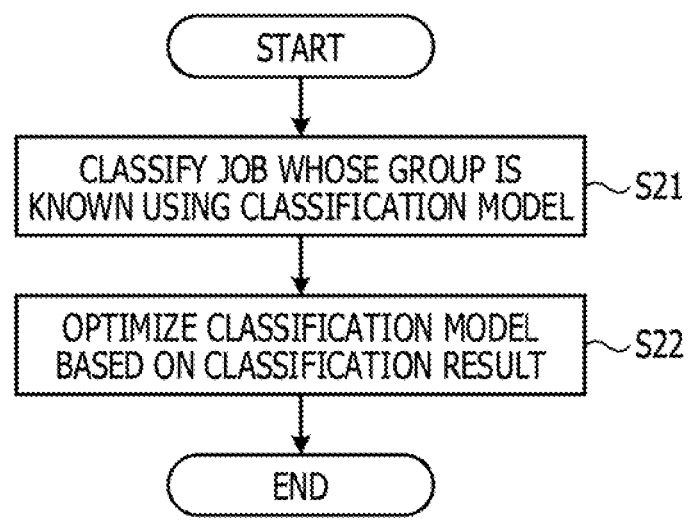
FIG. 13 is a flowchart illustrating the flow of a classification model learning process.

The flow of classification model learning process by the learning device 10 will be described with reference to FIG. 13. FIG. 13 is a flowchart illustrating the flow of a classification model learning process. As illustrated in FIG. 13, first, the learning device 10 classifies the job whose group is known based on the submission time information using a classification model (step S21). The learning device 10 optimizes the classification model based on the classification result (step S22).

Figure 14:
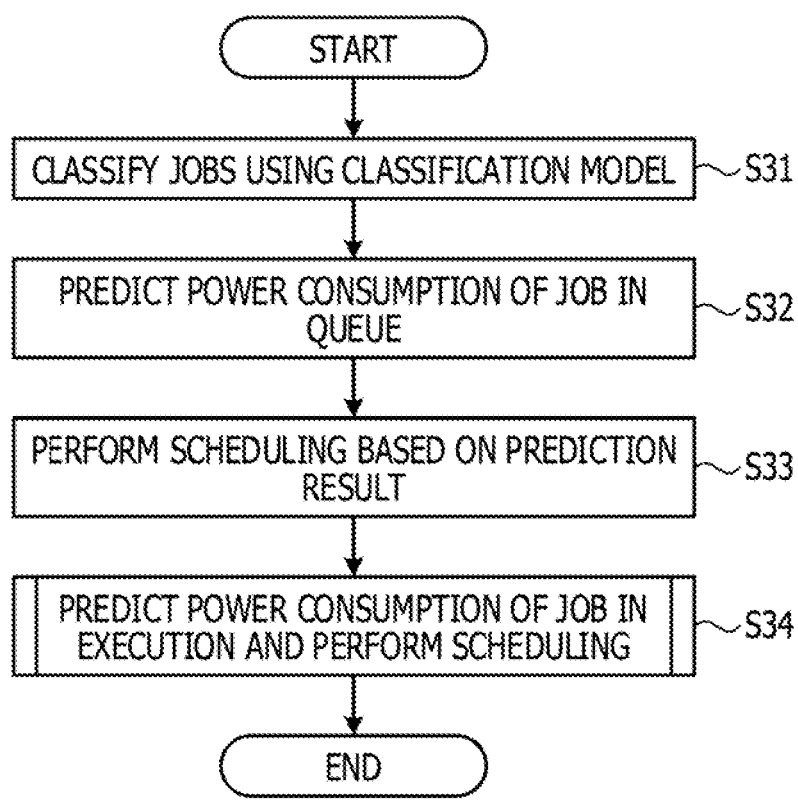
FIG. 14 is a flowchart illustrating the flow of the control process.

The flow of the control process by the control device 20 will be described with reference to FIG. 14. FIG. 14 is a flowchart illustrating the flow of the control process. As illustrated in FIG. 14, first, the control device 20 classifies the job based on the submission time information using the classification model (step S31).

Next, the control device 20 predicts the power consumption of the job in the queue (step S32). The control device 20 performs job scheduling based on the prediction result (step S33). The control device 20 predicts the power consumption of the job in execution, and performs job scheduling (step S34).

Two examples of the prediction process in step 34 will be described. In the following description, the prediction value of the power consumption output from the prediction unit 233 to the schedule control unit 231 and used for scheduling is referred to as a power estimation value.

Figure 15:
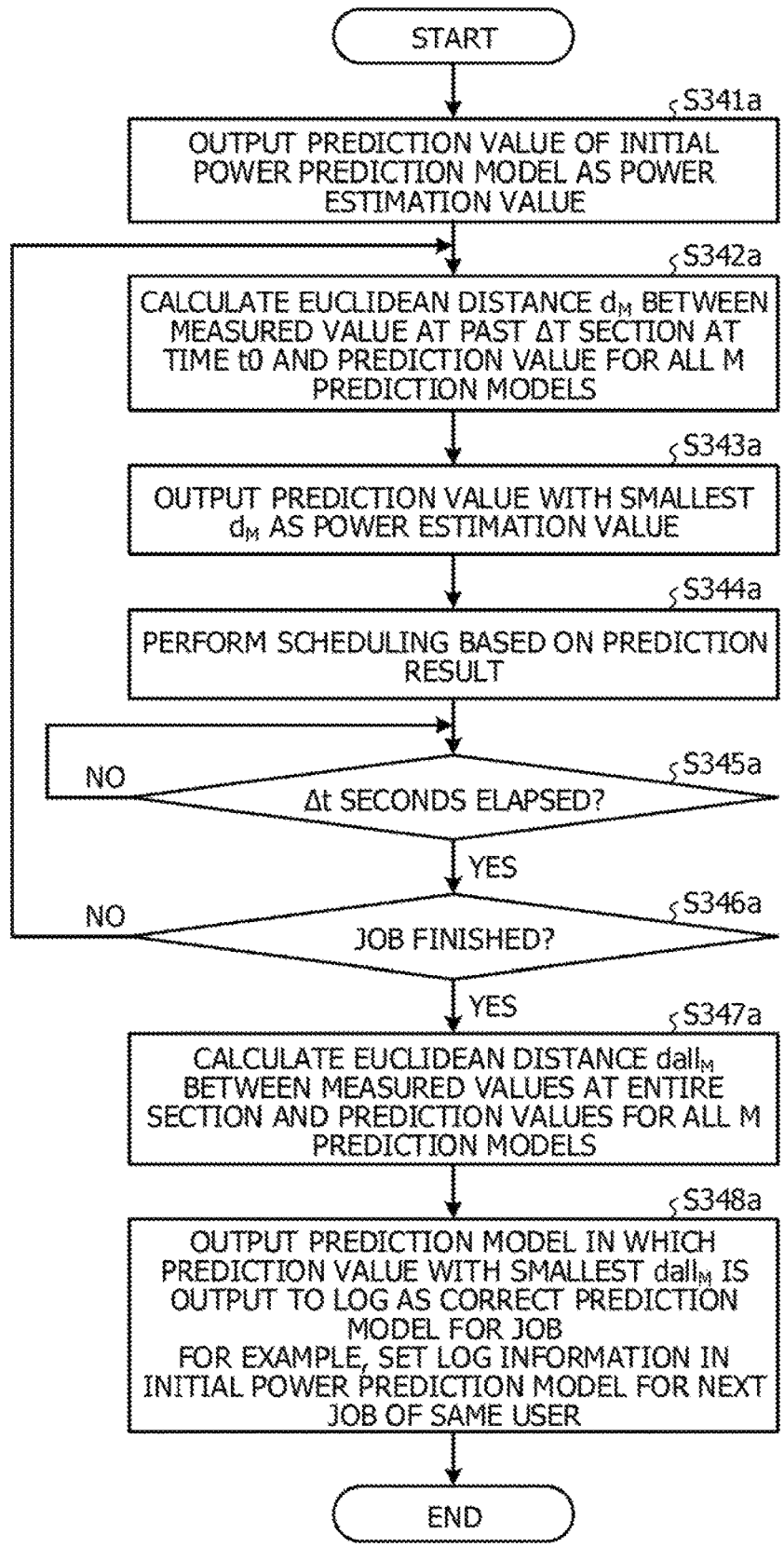
FIG. 15 is a flowchart illustrating the flow of the prediction process.

A first example of the prediction process will be described with reference to FIG. 15. FIG. 15 is a flowchart illustrating the flow of the prediction process. As illustrated in FIG. 15, first, the control device 20 outputs the prediction value of the initial power prediction model as the power estimation value (step S341a). The initial power prediction model is a prediction model for predicting the power estimation value at the first section. For example, the initial power prediction model is a prediction model associated with the user performing the job in the user information 221.

Next, the control device 20 calculates the Euclidean distance $d_M$ between the measured value at the past ΔT section at time t0 and the prediction value for each of all M prediction models (step S342a). The control device 20 outputs the prediction value with the smallest $d_M$ as the power estimation value (step S343a).

The control device 20 performs scheduling based on the prediction result (step S344a). After the lapse of Δt seconds (step S345a, Yes), and when the job is not completed (step S346a, No), the control device 20 returns to step S342a and repeats the process.

On the other hand, after the lapse of Δt seconds (step S345a, Yes), and when the job is completed (step S346a, Yes), the control device 20 proceeds to the next process. The control device 20 calculates the Euclidean distance $dall_M$ between the measured value at the entire section and the prediction value for each of all M prediction models (step S347a).

The control device 20 outputs the prediction model in which the prediction value with the smallest $dall_M$ is output to the log as the correct prediction model of the job (step S348a). For example, the control device 20 sets the log information in the initial power prediction model of the next job of the same user via the user information 221.

Figure 16:
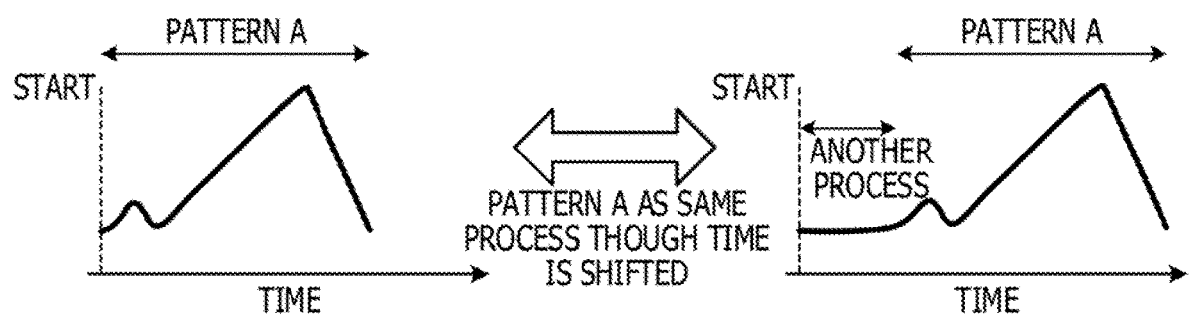
FIG. 16 is a diagram for explaining a shift in execution time.
Figure 17:
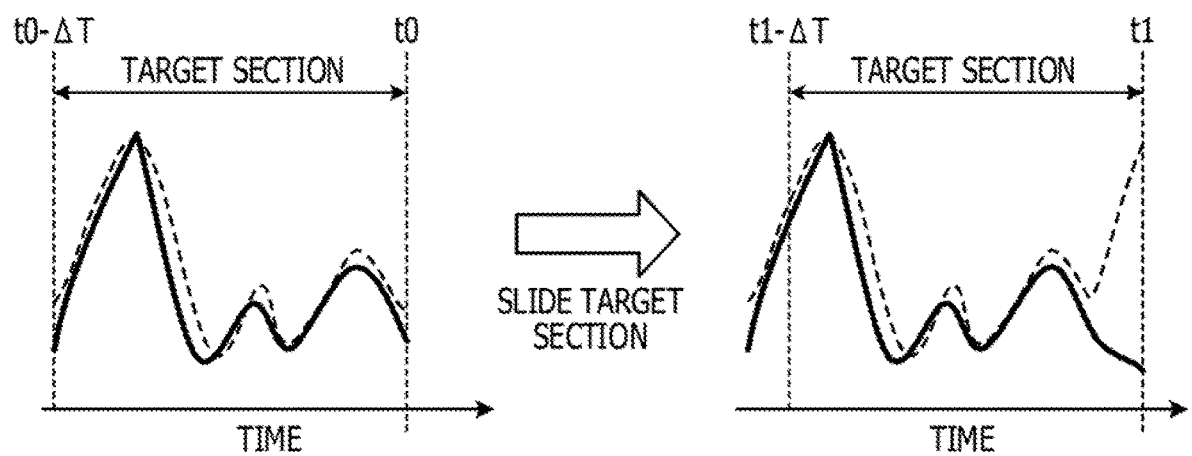
FIG. 17 is a diagram for explaining a slide of a target section.

FIG. 16 is a diagram for explaining a shift in execution time. As illustrated in FIG. 16, the power waveform of each job is composed of several patterns, and prediction is possible when the prediction value matches some of the patterns. FIG. 17 is a diagram for explaining a slide of a target section. In the first example of the prediction process, prediction is performed with the target section slid as illustrated in FIG. 17. For this reason, according to the first example of the prediction process, the prediction may be performed with a certain amount of calculation.

Figure 18:
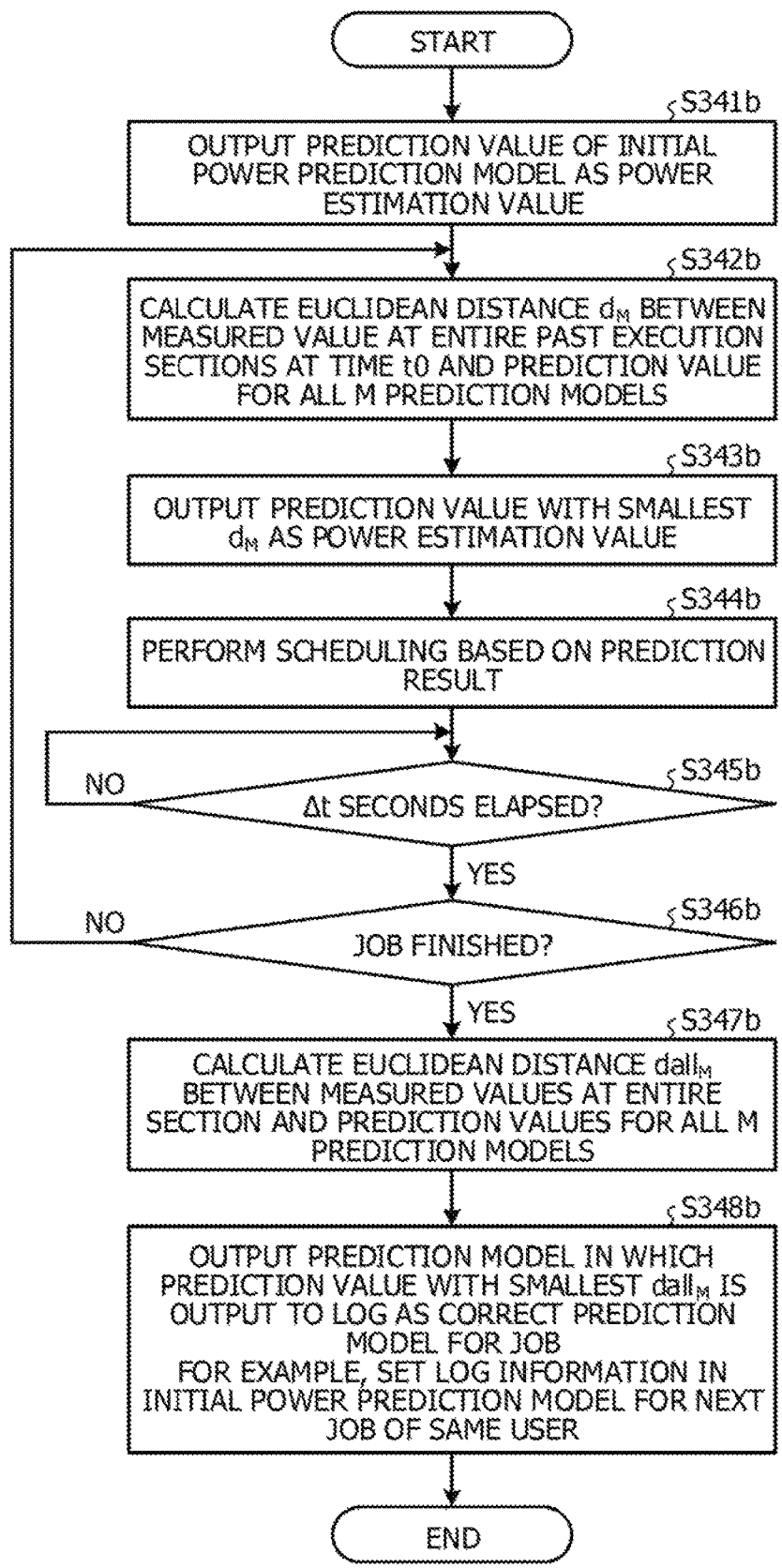
FIG. 18 is a flowchart illustrating the flow of the prediction process.

A second example of the prediction process will be described with reference to FIG. 18. FIG. 18 is a flowchart illustrating the flow of the prediction process. As illustrated in FIG. 18, first, the control device 20 outputs the prediction value of the initial power prediction model as the power estimation value (step S341b).

Next, the control device 20 calculates the Euclidean distance $d_M$ between the measured value at the entire past execution section at time t0 and the prediction value for each of all M prediction models (step S342b). The control device 20 outputs the prediction value with the smallest $d_M$ as the power estimation value (step S343b).

The control device 20 performs scheduling based on the prediction result (step S344b). After the lapse of Δt seconds (step S345b, Yes), and when the job is not completed (step S346b, No), the control device 20 returns to step S342b and repeats the process.

On the other hand, after the lapse of Δt seconds (step S345b, Yes), and when the job is completed (step S346b, Yes), the control device 20 proceeds to the next process. The control device 20 calculates the Euclidean distance $dall_M$ between the measured value at the entire section and the prediction value for each of all M prediction models (step S347b).

The control device 20 outputs the prediction model ire which the prediction value with the smallest $dall_M$ is output to the log as the correct prediction model of the job (step S348b). For example, the control device 20 sets the log information in the initial power prediction model of the next job of the same user via the user information 221.

Figure 19:
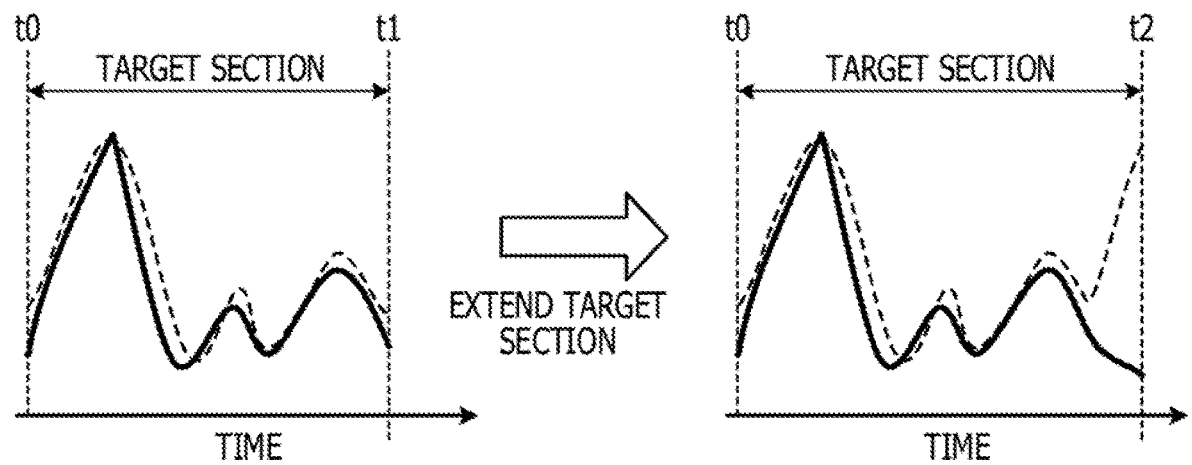
FIG. 19 is a diagram for explaining extension of the target section.

FIG. 19 is a diagram for explaining extension of the target section. In the second example of the prediction process, as illustrated in FIG. 19, the target section extends with time. For this reason, according to the second example of the prediction process, the accuracy of prediction when the time advances to some extent is improved.

[Effect]

As explained so far, the classification unit 131 classifies the jobs into a plurality of groups based on similarity of the execution time and the power consumption information of the jobs executed in the system. The construction unit 133 constructs a time series prediction model for each group that the classification unit 131 classifies using the power waveform included in each group as teacher data. The prediction unit 233 predicts, for each predetermined interval, a power waveform at a predetermined interval including the current time from a time series prediction model constructed for each classified group. The identification unit 235 compares the power waveform at a predetermined interval including the obtained current time with respect to the job in execution for which the power is to be predicted with the predicted power waveform to identify the similar time series prediction model. The prediction unit 233 predicts the power consumption at the next predetermined interval for the job for which power is to be predicted based on the identified time series prediction model. The schedule control unit 231 controls execution of the job based on the predicted power consumption. In this way, even when the power consumption pattern of the job in execution is changed over time, the job scheduler may predict the power consumption using a prediction model that matches the change. For this reason, according to the first embodiment, the power consumption of the system may be accurately predicted.

The identification unit 235 identifies the first time series prediction model that is most similar to the power waveform over the entire section of the first job, and when the second job is performed by the same user as the user performing the first job, identifies the first time series prediction model as the time series prediction model at the first predetermined section of the second job. The same user may perform the job having a similar power consumption pattern. Therefore, according to the first embodiment, it is possible to perform prediction with high accuracy even in the first section.

The determination unit 132 determines the weight bf each piece of information of the submission time information so that the submission time information set at the time of submission of the job included in the classified group is classified into each group. The classification unit 131 classifies the submission time information into a group according to the result obtained by assigning a weight to each piece of information determined as the submission time information of the power prediction target. The prediction unit 233 predicts power consumption from the time series prediction model of the classified group. As described above, the job scheduler may predict the power consumption pattern of the job in the queue from the submission time information. For this reason, according to the first embodiment, the power consumption of the system may be accurately predicted.

Figure 20:
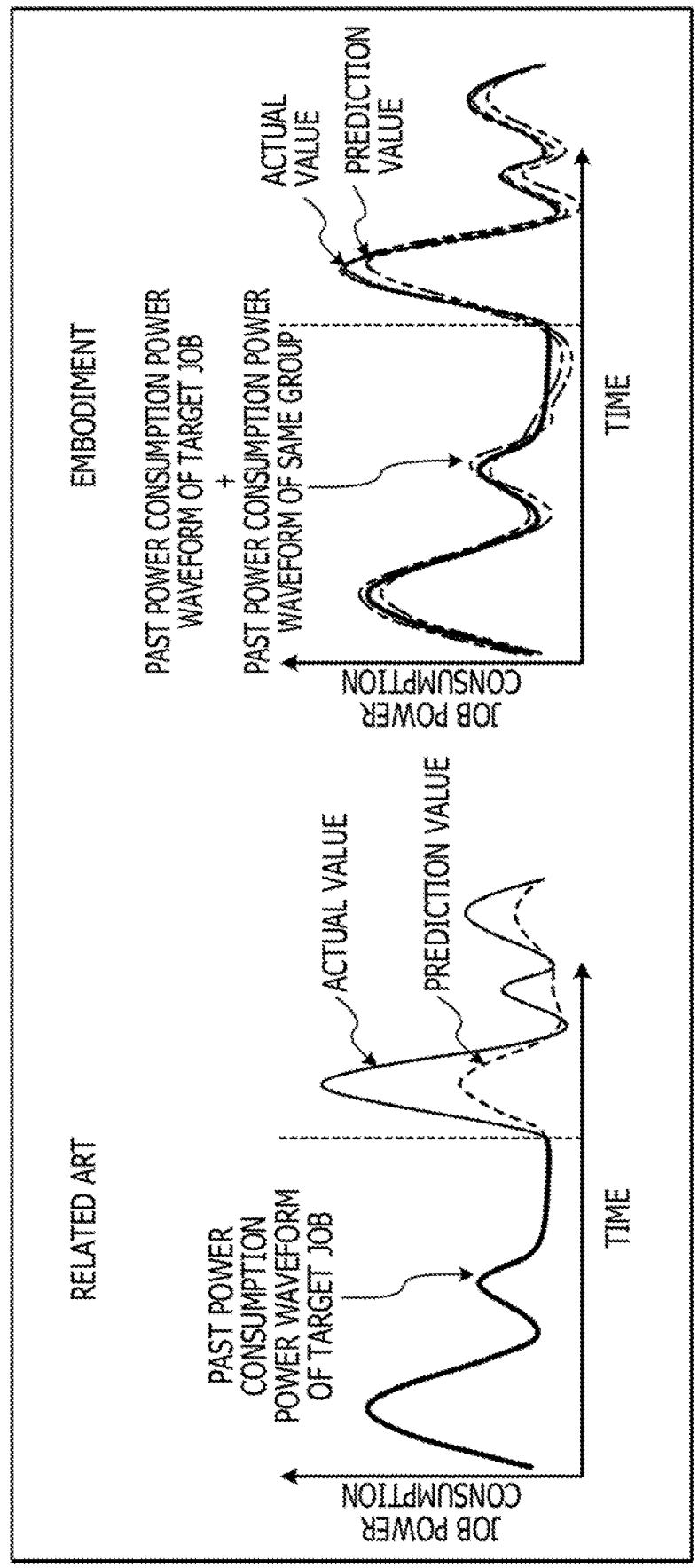
FIG. 20 is a diagram illustrating the effect of the embodiment.

FIG. 20 is a diagram illustrating the effect of the embodiment. As illustrated in FIG. 20, in the embodiment, since the prediction is made based on the past power waveforms of a plurality of jobs belonging to the same group, deviation between the actual value and the prediction value may be kept small, compared with that in the related art.

In the above embodiment, although the learning device 10 and the control device 20 is described as different devices, the learning function of the learning device 10 may be included in the function of the control device 20. The prediction unit 233 may use the prediction model of the group classified by the classification model as the initial power prediction model.

[System]

The processing procedures, the control procedures, the specific names, and the information including the various kinds of data and parameters cited in the specification and drawings described above may be changed in a given manner unless otherwise specified. The specific examples, distributions, numerical values, and so on described in the embodiment are merely examples and may be changed in a given manner.

The components of each of the apparatuses illustrated in the drawings are functionally conceptual and do not necessarily have to be physically configured as illustrated. For example, the specific configuration regarding the dispersion and integration of the apparatuses is not limited to the illustrated one. For example, all or some of the apparatuses may be configured to be distributed or integrated functionally or physically in given units depending on various loads, usage statuses, and so on. All or given some of processing functions performed by the apparatuses may be implemented by a CPU and a program to be analyzed and executed by the CPU, or may be implemented as hardware by wired logic.

[Hardware]

Figure 21:
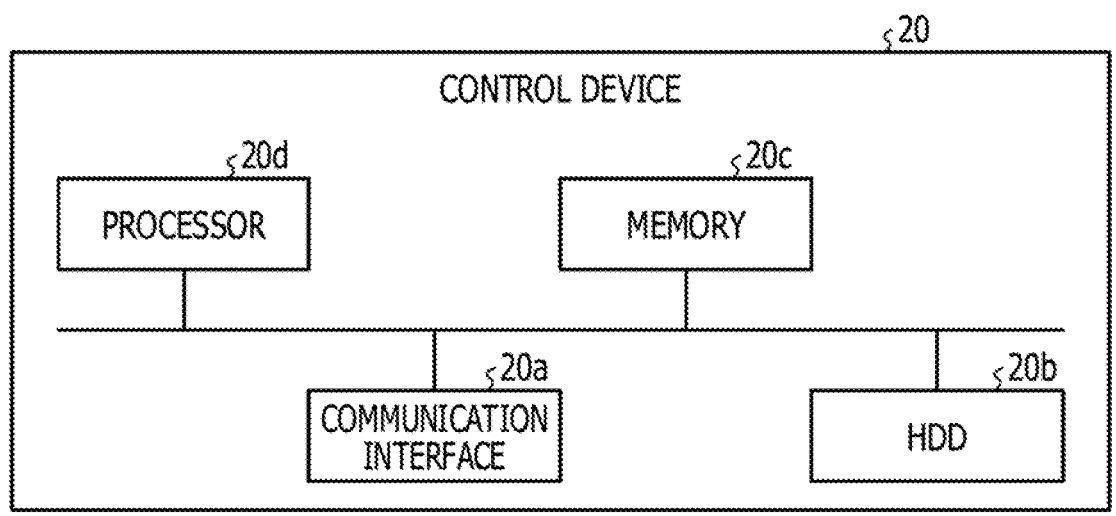
FIG. 21 is a diagram illustrating an example of a hardware configuration.

FIG. 21 is a diagram illustrating a example of a hardware configuration. As illustrated in FIG. 21, the control device 20 includes a communication interface 20a, a hard disk drive (HDD) 20b, a memory 20c, and a processor 20d. Respective units illustrated in FIG. 21 are coupled to each other through a bus or the like. The function of the learning device 10 is also implemented by a hardware configuration substantially same as that of the control device 20.

The communication interface 20a is a network interface card or the like and performs communication with other servers. The HDD 20b stores a job scheduler and a DB.

The processor 20d reads, from the HDD 20b or the like, a program (job scheduler) for executing the process substantially same as that of each of the processing units illustrated in FIG. 8 and loads the program to the memory 20c to operate the process of performing the functions described with reference to FIG. 8 and so on. For example, this process implements a function that is substantially same as that of each of the processing units included in the control device 20. For example, the processor 20d reads a program having substantially the same functions as the schedule control unit 231, the classification unit 232, the prediction unit 233, the measurement unit 234, and the identification unit 235 from the HDD 20b and the like. The processor 20d executes a process for performing substantially the same processing as the schedule control unit 231, the classification unit 232, the prediction unit 233, the measurement unit 234, the identification unit 235, and the like. The processor 20d is, for example, a hardware circuit such as a CPU, an MPU, and an ASIC.

In this way, the control device 20 operates as an information processing device that carries out a categorization method by reading and executing a program. The control device 20 may implement functions that are substantially the same as those of the embodiments described above by reading the program from a recording medium with a medium reading device and by executing the read program. The program described in other embodiments is not limited to a program that is executed by the control device 20. For example, the present disclosure may also be applied to cases where another computer or another server executes the program and where the another computer and the another server execute the program in cooperation with each other.

The program may be distributed via a network such as the Internet. The program may be recorded on a computer-readable recording medium such as a hard disk, a flexible disk (FD), a compact disc read-only memory (CD-ROM), a magneto-optical (MO) disk, or a digital versatile disc (DVD) and may be executed after being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A job scheduler comprising:
a memory; and
circuitry coupled to the memory and configured to:
based on similarity between execution time and power consumption information of a plurality of jobs executed in a system, classifies the plurality of jobs into a plurality of groups,
construct respective time series prediction models for the plurality of groups using a power waveform included in each of the plurality of groups as teacher data,
predict a power waveform at a predetermined interval including a first time from each of the constructed time series prediction models,
compare a power waveform at a predetermined interval including a first time of a job in execution for which power is to be predicted with the predicted power waveform of each of the plurality of groups to identify a similar time series prediction model from among the respective time series prediction models of the plurality of groups,
based on the identified time series prediction model, predict power consumption at a predetermined interval including a second time for the job for which power is to be predicted, and
control job execution based on the predicted power consumption,
the similarity is a sum of distances from first data points of a first waveform to second data points of a second waveform, each of which is closest to each of the first data points.

2. The job scheduler according to claim 1, wherein the identifying further includes identifying a first time series prediction model that is most similar to a power waveform over an entire section of a first job, and when a second job is performed by the same user as a user performing the first job, identifying the first time series prediction model as a time series prediction model at a first predetermined section of the second job.

3. The job scheduler according to claim 1, wherein the circuitry is configured to further
determine a weight of each piece of information of submission time information so that the submission time information set at a time of submission of a job included in the classified group is classified into each group,
classify the submission time information into a group according to a result obtained by assigning a weight to each piece of information determined as submission time information of a power prediction target, and
predict power consumption from a time series prediction model of the classified group.

4. A method of controlling a job schedule, the method comprising:
based on similarity between execution time and power consumption information of a plurality of jobs executed in a system, classifying the plurality of jobs into a plurality of groups,
constructing respective time series prediction models for the plurality of groups using a power waveform included in each of the plurality of groups as teacher data,
predicting a power waveform at a predetermined interval including a first time from each of the constructed time series prediction models,
comparing a power waveform at a predetermined interval including a first time of a job in execution for which power is to be predicted with the predicted power waveform of each of the plurality of groups to identify a similar time series prediction model from among the respective time series prediction models of the plurality of groups,
based on the identified time series prediction model, predicting power consumption at a predetermined interval including a second time for the job for which power is to be predicted, and
controlling job execution based on the predicted power consumption, the similarity is a sum of distances from first data points of a first waveform to second data points of a second waveform, each of which is closest to each of the first data points.

5. The method of controlling the job schedule according to claim 4, wherein the identifying further includes identifying a first time series prediction model that is most similar to a power waveform over an entire section of a first job, and when a second job is performed by the same user as a user performing the first job, identifying the first time series prediction model as a time series prediction model at a first predetermined section of the second job.

6. The method of controlling the job schedule according to claim 4, wherein the circuitry is configured to further
determine a weight of each piece of information of submission time information so that the submission time information set at a time of submission of a job included in the classified group is classified into each group,
classify the submission time information into a group according to a result obtained by assigning a weight to each piece of information determined as submission time information of a power prediction target, and
predict power consumption from a time series prediction model of the classified group.

7. A non-transitory computer-readable storage medium storing a program that causes a processor included in a computer to execute a process, the process comprising:
based on similarity between execution time and power consumption information of a plurality of jobs executed in a system, classifying the plurality of jobs into a plurality of groups,
constructing respective time series prediction models for the plurality of groups using a power waveform included in each of the plurality of groups as teacher data,
predicting a power waveform at a predetermined interval including a first time from each of the constructed time series prediction models,
comparing a power waveform at a predetermined interval including a first time of a job in execution for which power is to be predicted with the predicted power waveform of each of the plurality of groups to identify a similar time series prediction model from among the respective time series prediction models of the plurality of groups, and
based on the identified time series prediction model, predicting power consumption at a predetermined interval including a second time for the job for which power is to be predicted,
the similarity is a sum of distances from first data points of a first waveform to second data points of a second waveform, each of which is closest to each of the first data points.

* * * * *